United States Patent [19]

Lerner et al.

[11] Patent Number: 4,549,274
[45] Date of Patent: Oct. 22, 1985

[54] DISTRIBUTED ELECTRIC POWER DEMAND CONTROL

[75] Inventors: Edward M. Lerner, Naperville; Harold J. Olson, Hawthorn Woods, both of Ill.

[73] Assignee: Honeywell Inc., Minneapolis, Minn.

[21] Appl. No.: 512,519

[22] Filed: Jul. 11, 1983

[51] Int. Cl.[4] ............................................. G06F 15/46
[52] U.S. Cl. .................................... 364/492; 307/35; 307/39
[58] Field of Search ..................... 364/492, 493, 494; 307/35, 39, 40, 41

[56] References Cited

U.S. PATENT DOCUMENTS

| | | |
|---|---|---|
| 3,905,023 | 9/1975 | Perpiglia . |
| 4,112,488 | 9/1978 | Smith, III . |
| 4,130,865 | 12/1978 | Heart et al. . |
| 4,153,936 | 5/1979 | Schmitz et al. . |
| 4,167,786 | 9/1979 | Miller et al. ........................ 364/493 |
| 4,181,950 | 1/1980 | Carter, II ........................... 364/492 |
| 4,204,249 | 5/1980 | Dye et al. . |
| 4,213,182 | 7/1980 | Eichelberger et al. . |
| 4,228,496 | 10/1980 | Katzman et al. . |
| 4,264,960 | 4/1981 | Gurr ................................... 364/492 |
| 4,324,987 | 4/1982 | Sullivan, II et al. ........... 364/492 X |
| 4,337,401 | 6/1982 | Olson .............................. 364/492 X |
| 4,348,668 | 9/1982 | Gurr et al. ...................... 364/493 X |
| 4,354,241 | 10/1982 | Barello ............................... 364/492 |
| 4,357,665 | 11/1982 | Korff ............................... 364/493 X |
| 4,484,258 | 11/1984 | Miller et al. .................... 364/492 X |

*Primary Examiner*—Edward J. Wise
*Attorney, Agent, or Firm*—Trevor B. Joike

[57] ABSTRACT

A distributed load processing system for shedding and/or adding loads controlled by a plurality of processors for maintaining power demand by the loads below a predetermined amount including a common communication channel, a plurality of processors connected to the common communication channel, a demand meter for sensing the power consumption per sample period so that the power consumption per sample period can be transmitted to all of the processors, wherein each processor compares the demand limit established for the system to the projected power per interval being consumed, and for shedding and/or adding its associated loads based upon this comparison to maintain power consumption per interval below the demand limit.

13 Claims, 12 Drawing Figures

FIG. 1
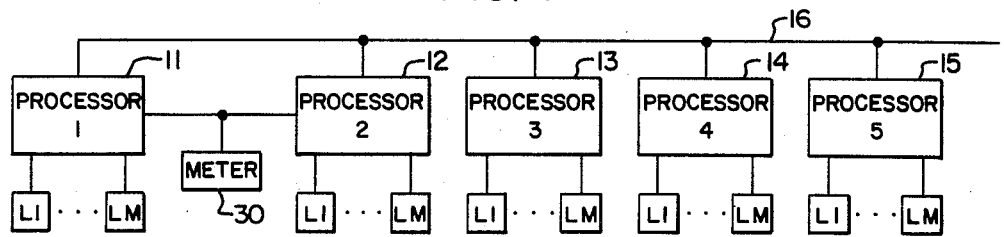
FIG. 2
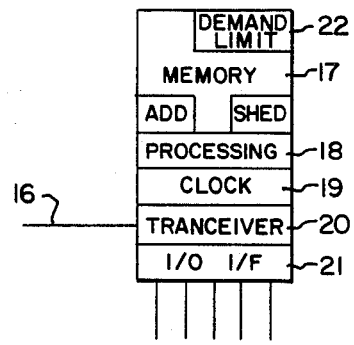
FIG. 3
| PROCESSOR | P1 | P2 | P3 | P4 | P5 |
|---|---|---|---|---|---|
| SHED TIME | T1 | T2 | T3 | T4 | T5 |
| TIER 1 LOADS | 100 KW | 20 KW | 40 KW | 0 KW | 30 KW |
| SHED TIME | T6 | T7 | T8 | T9 | T10 |
| TIER 2 LOADS | 50 KW | 40 KW | 0 KW | 0 KW | 20 KW |
| SHED TIME | T11 | T12 | T13 | T14 | T15 |
| TIER 3 LOADS | 20 KW | 0 KW | 20 KW | 60 KW | 0 KW |
| SHED TIME | T16 | T17 | T18 | T19 | T20 |
| TIER 4 LOADS | 40 KW | 10 KW | 0 KW | 40 KW | 0 KW |
| TIER M | | | | | |

FIG. 4 INTER-PROCESSOR COMMUNICATIONS TIMING

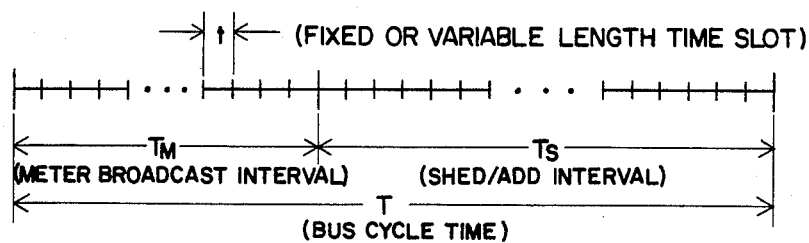

FIG. 5 METER PROCESSOR OPERATION

```
IF (BEGINNING OF SAMPLE PERIOD)
    SCAN VALUE OF KWH COUNTER
    CALCULATE KWH PER SAMPLE PERIOD (RATE)
    IF RATE IS OUTSIDE OF REASONABILITY LIMITS
        REPORT ERROR TO BUS AT OWN NEXT TIME SLOT
    ELSE
        REPORT RATE TO BUS AT OWN NEXT TIME SLOT
ELSE
    MAINTAIN INTERNAL INTERVAL TIMER FOR SAMPLE PERIOD
    MAINTAIN INTERNAL INTERVAL TIMER FOR DEMAND INTERVAL *
EXIT
```
* ONLY IF NO SYNCH CONTACT PROVIDED

FIG. 6 SHED/ADD PROCESSOR OVERVIEW

| DURING $T_M$ AT BEGINNING OF SAMPLE PERIOD | IMMEDIATELY AFTER $T_M$ AT BEGINNING OF SAMPLE PERIOD | DURING $T_S$, IN ANOTHER PROCESSOR'S TIME SLOT | DURING $T_S$, IN THIS PROCESSOR'S TIME SLOT |
|---|---|---|---|
| •SAVE ALL BROADCAST VALUES OF DEMAND RATE | •DETERMINE VALUE OF DEMAND RATE TO USE DURING THIS SAMPLE PERIOD (FIGURE 7) | •UPDATE SHEDTOT AND ADDTOT PER ANY SHED AND ADD MESSAGES ON THE BUS (FIGURE 8) | •SHED OR ADD LOAD IF APPROPRIATE (FIGURES 9,10) |
| | •INITIALIZE SHEDTOT AND ADDTOT FOR THIS SAMPLE PERIOD | •RESET "MANUAL SHED ALARM" REGISTER IF APPROPRIATE (FIGURE 11) | •SEND "MANUAL SHED ALARM" MESSAGE IF APPROPRIATE (FIGURE 12) |

FIG. 7 CALCULATED DEMAND

| MP$_1$'S READING OK ?* | MP$_2$'S READING OK ?* | VALUE USED IN CALCULATION |
|---|---|---|
| NO | NO | DEFAULT ** |
| NO | YES | MP$_2$'S READING |
| YES | NO | MP$_1$'S READING |
| YES | YES | MP$_1$'S READING |

$$\text{CALCULATED DEMAND} = \frac{\text{CURRENT VALUE} - \text{LAST VALUE}}{\text{TIME BETWEEN READINGS}}$$

*METER PROCESSOR'S READING OK MEANS:
  1) METER-READING MESSAGE RECEIVED FROM THAT PROCESSOR.
  2) READING IN THAT MESSAGE IS WITHIN REASONABILITY LIMITS.
**LAST VALUE + HIGH REASONABILITY LIMIT

FIG. 8 UPDATE SHEDTOT AND ADDTOT (NOT THIS PROCESSOR'S TIME SLOT)

```
IF SHED MESSAGE RECEIVED
    SHEDTOT = SHEDTOT - ANNOUNCED VALUE OF SHED LOAD
IF ADD MESSAGE RECEIVED
    ADDTOT = ADDTOT - ANNOUNCED VALUE OF ADDED LOAD
IF END-OF-ADD MESSAGE RECEIVED
    DISABLE ADD OPERATION FOR BALANCE OF SAMPLE PERIOD
EXIT
```

FIG. 9 SHEDDING LOGIC - THIS PROCESSOR'S TIME SLOT

```
IF SHEDTOT > 0
    IF CANDIDATE* LOAD ELIGIBLE** TO SHED
        SHED LOAD
        ANNOUNCE SHED TO BUS
        SHEDTOT = SHEDTOT - AMOUNT SHED
        IF SHEDTOT ≤ 0 THEN SEND END-OF-SHED MESSAGE (OPTIONAL)
    ELSE
        ANNOUNCE 0 KW SHED
EXIT
```

*SEE FIGURE 3
**'ELIGIBLE' MEANS THAT THE LOAD SATISFIES TWO CRITERIA:
  1) IT WAS TURNED ON (ADDED) BY AN APPLICATION WITH PRIORITY LESS THAN OR EQUAL TO DEMAND CONTROL'S PRIORITY.
  2) ITS MINIMUM ON TIME REQUIREMENT, IF ANY, MUST HAVE BEEN MET.

FIG. 10 ADDING LOGIC -THIS PROCESSOR'S TIME SLOT

```
IF ADDTOT > 0
    IF CANDIDATE * LOAD ELIGIBLE ** TO ADD
        ADD LOAD
        ANNOUNCE ADD TO BUS
        ADDTOT = ADDTOT - AMOUNT ADDED
    ELSE
        ANNOUNCE O KW ADD
        IF CANDIDATE LOAD ≥ ADDTOT
            SEND END-OF-ADD MESSAGE (OPTIONAL)
EXIT
```
---
*SEE FIGURE 3
**'ELIGIBLE' MEANS THAT THE LOAD SATISFIES THREE CRITERIA:
   1) IT WAS TURNED OFF (SHED) BY THE DEMAND PROGRAM.
   2) ITS MINIMUM OFF TIME REQUIREMENT, IF ANY, MUST HAVE BEEN MET.
   3) ITS LOAD SIZE (KW) MUST BE LESS THAN THE CURRENT ADDTOT.

FIG. 11 MANUAL SHED ALARM (MSA) OPERATION
-NOT THIS PROCESSOR'S TIME SLOT

```
IF (SHEDTOT ≤ 0) OR (MSA RECEIVED) OR (HAVE NOT ATTEMPTED TO SHED LAST LOAD)
    SET MSA REGISTER TO CURRENT TIME
EXIT
```

FIG. 12 MANUAL SHED ALARM (MSA) OPERATION
-THIS PROCESSOR'S TIME SLOT

```
IF (SHEDTOT ≤ 0) OR (HAVE NOT ATTEMPTED TO SHED LAST LOAD)
    SET MSA REGISTER TO CURRENT TIME
IF [(MSA COUNTER) - (CURRENT TIME) > (TIME LIMIT)]
    SEND MSA MESSAGE
    SET MSA REGISTER TO CURRENT TIME
EXIT
```

DISTRIBUTED ELECTRIC POWER DEMAND CONTROL

BACKGROUND OF THE INVENTION

The present invention relates to a distributed electric power demand control system and, more particularly, to a system which comprises a plurality of processors in which each processor is responsible for shedding the electrical loads controlled by it and in which the processors communicate with one another so that the shedding of electrical loads can be coordinated between the plurality of processors.

Electric power companies have established various rates they charge for the consumption of power by their customers. For example, power companies may charge more during those hours of the day in which there is normally heavy usage of power than they do during off-peak hours, and may also levy a surcharge against individual non-residential users based on the user's highest demand during an entire billing period (typically each month). Demand is the average power (e.g., watts) over a demand interval, typically 15 minutes long. As a result, load add/shed systems have been devised in order to maintain demand below user established limits to thus avoid extra costs attributed to excessive electric power demand.

Heretofore, these add/shed systems have been concentrated in a single facility such that if the facility becomes nonfunctional, the add/shed system becomes nonfunctional and electric power demand may rise above a previously established demand limit.

SUMMARY OF THE INVENTION

The present invention is fault tolerant such that the load add/shed function can be maintained even though there is a malfunction in the system. Thus, the present invention involves a plurality of processors connected together by a common communication channel wherein each processor is responsible for adding and/or shedding its own loads. Each time it adds and/or sheds a load, that processor communicates the KW value for that load to the other processors so that each processor on the communication channel can recompute the total amount of load which must be added and/or shed in order to maintain power demand below an established limit value. In this manner, a failure of any one of the processors does not terminate the load add/shed function but, instead, allows the other processors to carry on the function to thus maintain power demand below the limit value.

BRIEF DESCRIPTION OF THE DRAWINGS

These and other features and advantages will become more apparent from a detailed consideration of the invention when taken in conjunction with the drawings in which:

FIG. 1 shows a multiprocessor system for adding and/or shedding loads in a distributed electric power demand control system (in this example, five processors are shown);

FIG. 2 shows the processors of FIG. 1 in more detail;

FIG. 3 shows the way in which the processors and loads may be arranged in priority order so that the system does not attempt to add and/or shed more than one load at a time;

FIG. 4 shows the timing of communications between the processors of FIG. 1;

FIG. 5 shows the operations performed by each of the processors which is connected to the electric meter (i.e., a meter processor);

FIG. 6 shows the operations performed by each of the processors which controls one or more loads which may be shed and added by the demand control feature (i.e., a shed/add processor);

FIG. 7 shows the details of the operations performed by each of the shed/add processors to calculate the electrical demand for the current sample period;

FIG. 8 shows the details of the operations performed by each of the shed/add processors in updating its data to reflect the actions of all other operational shed/add processors;

FIG. 9 shows the details of the operations performed by each of the shed/add processors in shedding an electrical load;

FIG. 10 shows the details of the operations performed by each of the shed/add processors in adding (restoring to operation) an electrical load which it had previously shed;

FIG. 11 shows the details of the operations performed by each of the shed/add processors in maintaining data for the determination of the need for manual intervention to avoid exceeding the pre-programmed electrical demand limit target value; and, FIG. 12 shows the details of the operations performed by each of the shed/add processors to determine whether manual intervention is required to avoid exceeding the pre-programmed electrical demand limit target value, and to send an appropriate advisory alarm to the human operator.

DETAILED DESCRIPTION

In FIG. 1, a plurality of processors 11, 12, 13, 14, 15 etc. are connected to common communication channel or bus 16. Each processor, as shown in FIG. 2, comprises the usual memory 17, processing section 18, clock 19, interprocessor communications transceiver 20 and input/output interface 21.

According to the present invention, memory 17 has a demand limit value 22 stored therein which is representative of a limit below which the system maintains an established power demand by adding and/or shedding loads. The demand limit value itself may be established manually or automatically at the beginning of each billing period, then either locked in place or allowed to float upwards or downwards in accordance with any of numerous user selected demand limit strategies; or it may be some value lower than the established demand limit to provide a margin of safety to insure that the limit is not exceeded.

Processing section 18 calculates the current actual demand and then, based upon the demand limit stored in memory 17, calculates the total amount of load which can be added (ADDTOT) or shed (SHEDTOT), and subsequently recalculates this amount as loads are added or shed by this or other processors through system operation. Section 18 also determines when and whether or not one of the loads connected to it can be added or shed. Memory 17 contains the identity and KW size of the loads associated with it.

Interprocessor transceiver 20 is connected to communication channel 16 so that each processor can transmit and receive information relative to the current total power demand and the add/shed routines of all active processors.

Input/output interface section 21 interfaces the processing system as shown in FIG. 2 with the loads as shown in FIG. 1.

Each processor will have a number of load positions L1-LM associated with it. Also, processors 11 and 12 (in this example) have an electric demand meter 30 connected through the respective input/output interface circuit 21 so that the energy (KWH) consumption per sample period can be measured and then transmitted to processors 11 and 12 to be broadcast to all of the processors in the system. The sample period has a length such that the ratio of the demand interval to the sample period is a whole number (typically 3 minute periods in a 15 minute interval). Meter 30 can be connected to any of the processors which participate in the add/shed function, or can be connected to other processors in the system, or to a combination thereof.

The add/shed routine resides in each of the processors having sheddable loads. Each processor has a sequence number (designated as P1-P5 as shown in FIG. 3) assigned to it, for example at the time of installation. Each processor may have one or more loads assigned to be added/shed by the add/shed function.

The first load assigned to each processor is termed a first tier load, the second load assigned to each processor is termed a second tier load and, finally, the Mth load for each processor is termed the tier M load. Thus, the processors and loads are arranged in priority order such that the tier 1 load of processor 1 is shed first, the tier 1 load of processor 2 is shed next and so on until the tier M load of processor PN is shed. Adding loads back is then done in reverse order. Tier 1 loads, since they are the first to be shed, are likely to be the least significant in terms of the criteria used to establish the priority sequence. For example, the load may be in a non-essential area of the building in which the system is located or the load itself may not be considered as important as other loads.

If a load which would otherwise have been assigned as a tier 1 load because it is last in a top down priority sequence for a given processor is more important than other first tier loads in the system, a dummy load is set up for that processor and assigned a 0 KW value. For example, as shown in FIG. 3, the least important load connected to processor 4 is considered too important for being either a tier 1 load or a tier 2 load and is, therefore, arranged as a tier 3 load. Thus, dummy loads are established as tier 1 and 2 loads for processor 4, each of which is assigned a 0 KW value and would appear as loads to the rest of the system even though they have a 0 KW value. Also, processor 3 has a first load assigned to it which is least important and is assigned as a tier 1 load. However, all of the other loads are considered too important to connect them as a tier 2 load and, therefore, the next load in processor 3 is connected as a tier 3 load. A dummy load is, therefore, set up for processor 3 as a tier 2 load and assigned a 0 KW value. The number of tier positions for each processor will be equal to or greater than the number of tiers found in the processor having the largest number of sheddable loads.

Loads may also be dynamically reordered in each processor at the beginning of each sample period in accordance with a "comfort fairness" procedure under which loads are sequenced for adding or shedding according to each load's deviation from its "comfort index".

Strategies that determine how stringently loads must be shed can be made in a number of ways. For example, a strategy may be employed that at each sample period the system will return demand to an "ideal rate line" by the end of the subsequent sample period. Alternatively, an adaptive algorithm can be employed for predicting during the early sample periods of an interval the probable demand over the entire interval. This predicted demand is then compared against a demand limit for determining the amount of load which must be shed to prevent demand over the entire interval from exceeding the established demand limit. These same sorts of routines can be used for determining when loads should be added. Other demand strategies can also be used.

Assuming that a determination is made as to how much load should be shed and assuming that no loads were theretofore shed, and that all processors are currently operational, the first load eligible to be shed is the tier 1 load in processor 1, the second load eligible to be shed is the tier 1 load in processor 2 and so on until all tier 1 loads are considered for shed. The next load eligible to be shed is the tier 2 load in processor 1 followed by the tier 2 load in processor 2 and so on until all tier 2 loads are considered for shed. Eventually, all of the loads in all of the tiers for all of the processors may have to be considered for shed.

Adding of loads is also sequential but in reverse order starting with the tier M load in the last processor and then working back to the tier 1 load in processor 1. A time t separates each load shed or added. The value of the time t is only as large as need be to accommodate timing errors, queue times, calculation times, bus traffic and so on (typically a value less than one second).

Meter 30 is directly connected to two or more processors. Each such meter processor broadcasts the value of KWH/sample period which it has calculated, by either hardware or software means, over the bus. Any of the meter processors may also be, but need not be, a shed/add processor. (Although a processor may provide both meter reading and add/shed services, the algorithm for each service is disjoint from the algorithm of the other, and each may be considered separately.) If a meter processor detects that its calculated value of KWH/sample period is outside of reasonable limits, then it may broadcast a warning to that effect over the bus, instead of broadcasting its calculated value. (As shown below and in FIG. 7, each shed/add processor independently checks the reasonability of each meter reading, so an error message from a meter processor is optional.)

In all cases, each meter processor is connected to the KWH contact of the meter. If the meter is equipped with a synchronization (sync) pulse contact, then each meter processor is also connected to that contact. For clarity of exposition, this description assumes that meter 30 provides a sync pulse contact to signal the start of each electrical demand interval. In cases where the electrical demand meter does not provide a sync pulse contact, then each meter processor maintains its own interval timer, in synchronization with the interval timers of all other processors, using any of the techniques which are available for distributed processing systems for distributed clock control. Each meter processor is responsible for broadcasting a beginning-of-interval message, however derived, over the bus. Regardless of the presence or absence on the meter of a sync contact, each meter processor administers an internal interval timer which produces an output at the end of each sample period; all such sample-period timers are maintained in synchronization.

FIG. 4 shows the timing relation between the operations of the various processors in the system. A complete bus cycle, of duration T, is composed of two subintervals, a meter-broadcast interval Tm and a shed/add interval Ts. Each meter processor has a time slot for broadcasting over the bus during Tm and each shed/add processor has a time slot for broadcasting over the bus during Ts. Tm and/or Ts may also contain one or more time slots during which processors which do not have any demand-control functions also access the bus. Any meter processor which also has a sheddable load assigned to it has allocated to it both a time slot within Tm for its meter function and a time slot within Ts for its shed/add function. The details of the interprocessor communications protocol (e.g., whether each time slot's duration t is fixed or variable, or whether multiple messages may be sent per time slot) are transparent to the demand-control application.

Bus cycle time T is typically on the order of a second, much shorter than a demand interval (typically 15 minutes) or a sample period (typically 3 minutes). Interval Tm is used for demand control only during the first complete bus cycle of each sample period. At this time, each meter processor broadcasts either its calculated value of KWH/sample period, if that value is within reasonability limits, or (optionally) reports an error if that value falls beyond those limits (see FIG. 5). When the beginning of the sample period coincides with the beginning of a demand interval, then the message also contains an indication that a new demand interval has begun. At all other times, the sole operation of the meter processors is keeping in synchronization with each other and with all other processors.

FIG. 6 highlights the functions of each shed/add processor at various intervals within the bus cycle. During Tm of the first bus cycle following the beginning of a sample period, each shed/add processor obtains all broadcast values of KWH/sample period. Each processor maintains an internal interval timer for the sample period so that it can determine if such broadcasts are overdue (e.g., if the meter processors have all failed). Following Tm of this bus cycle, each shed/add processor uses all information which is available to it to calculate a value for the demand rate during the new sample period. (In FIG. 6 and below, it is assumed that this calculation is completed by the start of the immediately-following Ts. This specific timing relationship is not required (e.g., the first Ts of the sample period may be reserved for performing the calculation)). During Ts, each shed/add processor attempts to add or shed a load, as appropriate, during its own time slot; it will also, if appropriate, broadcast an alarm if manual intervention appears necessary to avoid a demand-limit violation. During all other processors' time slots within Ts, each shed/add processor keeps its calculated shed/add targets (shed total and add total) current per the update messages available on the bus; it also resets its manual-shed-alarm register if the automatic algorithm appears to be working.

FIG. 7 provides a detailed example of how, in a system which is equipped with two meter processors, a shed/add processor can calculate demand. (Other routines are possible—for example, a system with three meter processors could use voting to identify the failed meter processor.) Here, meter processor 1's reading is always used if it was received when expected and was within reasonability limits. If meter processor 1's reading fails either of these tests, then meter processor 2's reading will be used if it passes its corresponding two tests. If neither meter processor's reading passes both tests, then the shed/add processor will use the default value for the meter reading. (This default is typically the value used at the last sample period increased by the maximum reasonable increment per sample period.)

Each shed/add processor must stay synchronized with the system to be able to detect the non-receipt of messages from the meter processors. Once the shed/add processor determines the measured or inferred value of the meter for use during the current sample period, it then forecasts the electrical demand. Any predictive algorithm (e.g., the fixed-interval predictive algorithm) may be used.

FIG. 8 shows the operation used by each shed/add processor during Ts, but outside of its own time slot, to update its add/shed targets for the current sample period. If a shed message is received, then this processor decrements its shed total by the announced value of the shed. If an add message is received, then this processor decrements its add total by the announced value of the add. If the optional end-of-add message is received (see below and FIG. 10) then this processor suspends add operations for the balance of the current sample period.

FIG. 9 shows the logic of a shed/add processor, during its own time slot within Ts, when a shed is indicated. If the processor, based upon its calculated demand at Tm (at the beginning of this sample period) and the cumulative sum of this sample period's shed messages, determines that it should attempt to shed a load, then it executes this logic. It first examines its shed/add table (FIG. 3) to determine if the currently appropriate load is eligible to be shed. To be eligible, the load must satisfy two criteria: (1) it was turned on (added) by an application with priority less than or equal to demand control's priority, and (2) its minimum on-time requirement, if any, must have been met. If a load is eligible for shedding, then the processor sheds the load, announces the amount of the shed to the bus, and decrements its calculated shed total. If the shed total is now non-positive, the shed/add processor may also announce the completion of this sample period's shed to the bus. (This output message is an optional feature. Such a message may be desired if one or more processors in the system is assigned to capture the message and to reformat it for a human operator.) If the shed/add processor has no eligible load, then it annunciates a null (zero-valued) shed.

FIG. 10 shows the logic of a shed/add processor, during its own time slot in Ts, when an add is indicated. If the processor, based upon its calculated demand at Tm (at the beginning of this sample period) and upon the cumulative sum of the add messages for this period, determines that it should attempt to add a load, then it executes this logic. It first examines its shed/add table (FIG. 3) to determine if the currently appropriate load is eligible to be added. To be eligible, the load must satisfy three criteria: (1) it was turned off (shed) by the demand program, (2) its minimum off-time requirement, if any, must have been met, and (3) its load size (KW) must be less than the current ADDTOT. If a load is eligible to be added, then the processor adds it, announces the amount of the addition to the bus, and decrements its calculated add total. If, on the other hand, the processor does not have a load which is eligible to be added, then it annunciates a null addition. If the candidate load was not eligible because it was larger than the maximum possible addition, then the shed/add processor may optionally send an end-of-add message to all other shed/add processors. Such a message would cause the other processors to suspend add operations, so that this load could be added in its proper order at a succeeding time to add load.

FIG. 11 shows the logic of a shed/add processor, during Ts but outside of its own time slot, to administer a test for possible transmission of a request for manual intervention (a manual shed alarm). (The manual shed alarm is an optional feature which is useful when the system includes one or more processors at which alarms may be given to the human operator, and from which the human operator may manually shed one or more loads.) The processor tests whether an alarm is appropriate. Specifically, this alarm is suppressed if any of the following conditions is true: the current calculated shed total is non-positive; a manual shed alarm was received from another processor during this time slot; the current shed process has not yet passed the last tier load. If any of these conditions is true, then the processor sets the value of its manual-shed-alarm register to the current system time.

FIG. 12 shows the logic of a shed/add processor, during its own time slot within Ts, in administering its manual-shed-alarm register and (possibly) in transmitting a manual shed alarm. If the current calculated value of the shed total is non-positive, or if the shed process has not yet reached the last tier load, then the processor will set its manual-shed-alarm register to the current system time, thereby giving the demand control additional time to function. If neither of these conditions is satisfied, then the processor compares the current content of the manual-shed-alarm register to the current system time. If the difference between the current and saved times exceeds a time limit (typically, a maximum length bus cycle), then the processor sends a manual-shed-alarm message and resets the manual-shed-alarm register to the current system time. This algorithm therefore guarantees that the automated demand-control strategy is allowed to run to completion in an attempt to avoid a demand limit violation before annunciating a request for manual intervention; it allows any processor to identify and annunciate the alarm once the automated action fails to bring the demand forecast beneath the target value.

The embodiments of the invention in which an exclusive property or right is claimed are defined as follows:

1. A distributed load processing system for shedding and/or adding loads controlled by a plurality of processors for maintaining power demand by said loads below user established limits comprising:
   a common communication channel;
   a plurality of processors connected to said common communication channel;
   means for sensing the power consumption of said loads and for transmitting said power consumption to said plurality of processors; and,
   each of said processors having demand limit means for establishing a demand limit representing a desired power demand limit, means for comparing the demand limit to said power consumption, and means for determining when a processor should shed and/or add its associated loads to maintain said power consumption below said demand limit.

2. The system of claim 1 wherein each of said processors includes transmission means for announcing the KW value to the common communication channel for the loads which have been shed and/or added by it.

3. The system of claim 2 wherein each of said processors includes means for recomputing the amount of load which must be shed and/or added each time it receives a KW value of a load which has been shed and/or added.

4. The system of claim 3 wherein each of said processors includes means for determining the priority sequence of said processors and for determining when each of said processors should shed and/or add a load.

5. The system of claim 4 wherein each processor includes means for determining the eligibility of a load to be shed and/or added.

6. The system of claim 5 wherein each of said processors includes means for transmitting an end of shed message, said end of shed message being transmitted by the processor which shed the last load which must be shed.

7. The system of claim 6 wherein each of said processors includes means for transmitting an end of add message, said end of add message being transmitted by the processor which determined that adding is finished for a current sample period.

8. A distributed load processing system for shedding and/or adding loads controlled by a plurality of processors for maintaining power consumption by said loads below a predetermined amount comprising:
   a common communication channel;
   a plurality of processors connected to said common communication channel;
   means for sensing the power consumption of said loads and for transmitting said power consumption to said plurality of processors; and,
   each of said processors having
      priority means for establishing a priority sequence in which said processors can shed and/or add loads and for establishing the loads controlled by a respective processor in a tier arrangement for governing the sequence in which the loads of a processor are shed and/or added,
      demand limit means for establishing a demand limit representing a desired power demand limit,
      means for comparing the demand limit to said power consumption, and
      means for determining when a processor should shed and/or add its associated loads to maintain said power consumption below said demand limit.

9. The system of claim 8 wherein each of said processors includes transmission means for announcing the KW value to the common communication channel for the loads which have been shed and/or added by it.

10. The system of claim 9 wherein each of said processors includes means for recomputing the amount of load which must be shed and/or added each time it receives a KW value of a load which has been shed and/or added.

11. The system of claim 10 wherein each processor includes means for determining the eligibility of a load to be shed and/or added.

12. The system of claim 11 wherein each of said processors includes means for transmitting an end of shed message, said end of shed message being transmitted by the processor which shed the last load which must be shed.

13. The system of claim 12 wherein each of said processors includes means for transmitting an end of add message, said end of add message being transmitted by the processor which determined that adding is finished for a current sample period.

* * * * *